United States Patent [19]

Willey

[11] Patent Number: 4,952,006
[45] Date of Patent: Aug. 28, 1990

[54] HOOD SHIELD ASSEMBLY WITH BREAKAWAY MOUNTING

[75] Inventor: Barry A. Willey, Maywood, Ill.

[73] Assignee: National Cycle, Inc., Maywood, Ill.

[21] Appl. No.: 426,722

[22] Filed: Oct. 24, 1989

[51] Int. Cl.$^5$ .............................................. B60J 1/20
[52] U.S. Cl. .................................. 296/91; 296/180.1; 180/69.2
[58] Field of Search ................... 296/91, 180.1, 180.2; 403/DIG. 3; 180/68.1, 69.2

[56] References Cited

U.S. PATENT DOCUMENTS

| | | | |
|---|---|---|---|
| 4,052,099 | 10/1977 | Lowery et al. | 296/91 |
| 4,153,129 | 5/1979 | Redmond | 296/91 |
| 4,547,013 | 10/1985 | McDaniel | 296/180.1 |
| 4,621,860 | 11/1986 | Gerst | 296/91 |
| 4,629,657 | 12/1986 | Daniels et al. | 296/91 |
| 4,840,418 | 6/1989 | Bockenhauser | 296/91 |

Primary Examiner—Robert R. Song
Attorney, Agent, or Firm—James T. FitzGibbon; Angelo J. Bufalino

[57] ABSTRACT

A shield assembly for attachment to the hood of the road vehicle wherein the shield assembly includes a one-piece deflector unit with a principal section adapted to protect the exterior surface of the vehicle hood and a rearwardly extending mounting section, a plurality of mounting brackets, each including hood attachment and shield attachment sections, with the mounting brackets being secured to the shield by frangible fasteners having an ultimate yield strength such that forces tending to separate the deflector unit from the brackets will cause the fasteners to break before the elastic limits of the deflectors unit are reached or exceeded.

8 Claims, 1 Drawing Sheet

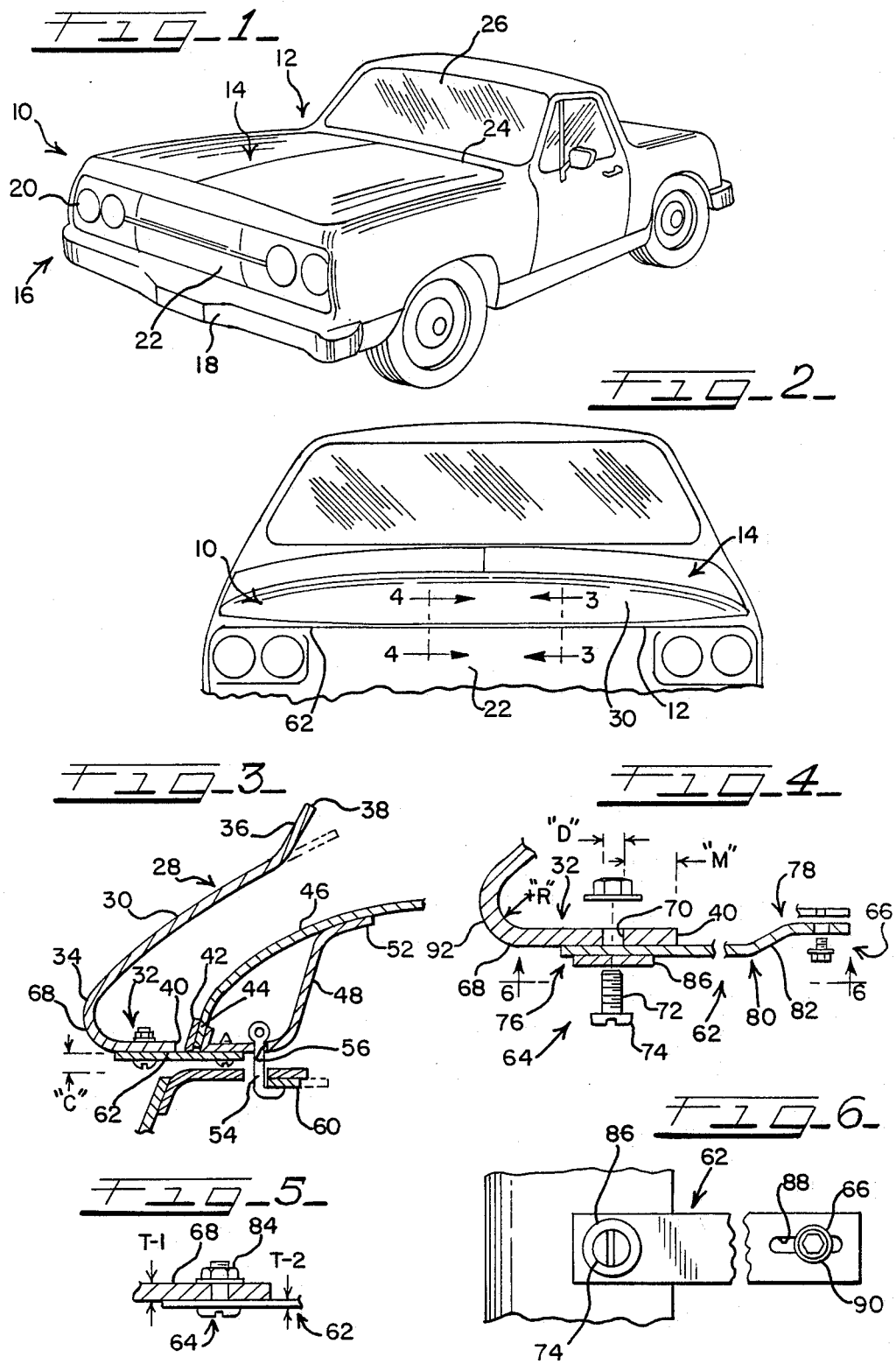

HOOD SHIELD ASSEMBLY WITH BREAKAWAY MOUNTING

BACKGROUND OF THE INVENTION

The present invention relates generally to hood shield units for the front areas of road vehicles such as light duty trucks, pickup trucks, and vans, as well as automobiles and the like.

Most automotive vehicles offered for sale today, particularly ordinary automobiles and light trucks of various kinds, including pickup trucks and vans, have, when considered in their front aspect, certain surfaces which are generally resistant to damage from airborne objects such as particles of gravel, sand, flying insects, debris falling from other road vehicles, and the like. The portions of most modern vehicles lying beneath the bumper are usually made from plastic or coated metal which is relatively impact resistant, and which, not being readily visible in most cases, is not normally finished with high gloss materials. Above this area is the vehicle bumper, which is commonly made from metal and covered with either rubber or rubber-coated material, or from an impact resistant, bright-finished material such as chrome plated steel, anodized aluminum or the like.

Above the bumper level are other materials which include an impact-resistant finish. These include headlights, headlight covers and their associated moldings, vehicle grillework and the like. These elements are often made from an impact-resistant molded plastic, from chrome plated metal, or from anodized aluminum or the like. Those portions of the frontal aspect of the vehicle that do not possess a bright finish are often made from other impact-resistant materials, such as plastic or metal with a matte black finish or the like. All of these areas resist impact damage from sand, gravel, etc., or at least do not readily show damage if it is present.

In most cases, the glossy painted finish of the vehicle begins at and extends upwardly from the front of the hood line, i.e., the area where the lower front part of the hood joins the remainder of the vehicle. The portions of the vehicle extending rearwardly from the grille, over and/or around the fenders and elsewhere on the vehicle, are usually painted with a high gloss finish. In other words, the portions of the vehicle, such as the bumper, lights and grille are generally made from impact resistant materials below the hood line, while the vehicle parts above the hood line are provided with a glossy finish.

Where portions of the vehicle front extend vertically or lie at or slightly behind the plane of the forwardmost section of the vehicle, there is significant exposure in use of the vehicle to sand, gravel, and other airborne particles which, with the passage of time, disfigure or even damage the vehicle front end. In particular, the front of the hood and other areas is susceptible to impact damage from sand, gravel and the like.

This problem is not as pressing in certain urban areas, which have well maintained roads, as it is in rural areas, but gravel damage and the like can be a significant problem with vehicles which traverse sand or gravel roads, or even hard surface roads which occassionally have deposits of sand, gravel or the like on them. In addition, many areas of the country, particularly dessert and agricultural areas, have an everyday atmosphere in which significant amounts of sand, gravel or other abrasives are simply entrained in the air as a result of the wind movement.

In order to forestall damage to the lower forward portion of the hoods on such vehicles, and the upper portion or entire hood area on certain vehicles such as vans or the like, it has been common to provide hood shields or deflectors for protection of the vehicle finish in this area. Customarily, these are contoured units roughly paralleling the front surface of the lower part of the hood and extending first upwardly and then rearwardly in this area. In the past, such units have often been made from plastic sheet materials for reasons of manufacturing ease, low cost and ready formability.

The most popular materials for this purpose have been the acrylic plastic materials, polycarbonate ("Lexan") plastics and in some cases, modified acrylics or modified cellulose acetate materials, such as "CAB" or the like. Many, if not all prior art hood shield of this type, because of their contours, possess significant stress concentrations or stress "risers" which create risks of cracking or breakage. Usually, these areas are found in the transition surfaces between the impact receiving or most vertical portion of the shield and the mounting flange, and/or at and around the areas wherein the shield mounting fasteners are positioned.

In cases where the shield is rigidly mounted along a rear edge or margin, and no means are provided to prevent cracking, applying undue force to the body of the shield will often cause cracking or breakage either along the sharply curved or contoured regions. A more common type of failure occurs adjacent the rearward sections of the shield mounting flange. Here, where mounting tabs have been provided, and fasteners have been used to secure these areas to the vehicle hood, stress concentrations are great, and with continued vibration and other stresses, the underlying material becomes embrittled and stress concentrations lead to cracks or other premature failure.

In other cases, where mounting tabs are not provided, the shield may also be subjected to breakage around the fastener openings. These stresses can result from abrasion or fastener overtightening, for example. Leaving fasteners loose can create wear and distortion of the openings, while excess tightening amplifies vibration.

In those cases wherein the mounting flange of the shield has been designed to pass beneath the lowermost flange of the hood, prior art designs have often used narrow thicknesses of material or sharply angled formations to fit in the limited space available. This has acted to create other instances of high stress concentrations leading to premature failure. As is implicit from the foregoing statements, as the space between opposed facing surfaces of the vehicle body forming the hood parting line is reduced, the problem of providing space for the passage of the deflector or its mounting system become more difficult. Consequently, maladjustment of the hood clearance can cause the hood to strike and pinch the deflector shield when the hood is not carefully closed. In some cases, the shield may inadvertently be permanently clamped between opposed facing surfaces of the hood flange and the hood locking or positioning units adjacent the engine bay of the vehicle.

In view of the foregoing shortcomings of prior art hood shields, there has been a need for a deflector shield which may be readily installed on vehicles in spite of very close or minimal clearances between adjacent relatively fixed and movable hood-locking portions of an automobile.

In addition, there has been a demand for a mounting system which, under ordinarily foreseeable conditions, will not subject the elements of the shield assembly to breakage in use. In particular, there has been a demand for a mounting system whereby, if there is a breakage or failure of an installed shield unit, the breakage is not that of the major, most expensive part of the assembly. In addition to the need for overcoming the foregoing problems, there has also been a need for shield designs which are more convenient in installation and use and which may be made without sacrifice of advantageous features or incorporating other disadvantages. A desirable shield includes additional features such as multi-vehicle adaptability, adaptability to providing bug deflectors and the like.

In view of the failure of the prior art to overcome the foregoing difficulties, it is an object of the present invention to provide an improved hood shield assembly for motor vehicles.

Another object of the present invention is to provide an improved hood shield assembly which includes a one-piece contoured deflector unit with a principal or impact-resisting section and a mounting section, with a plurality of mounting brackets secured to the vehicle along one locus and secured to the shield by breakaway fasteners extending between selected portions of the shield and parts of the mounting brackets forming a part of the assembly.

A still further object of the invention is to provide a hood shield assembly having a deflector unit which includes a mounting section joined to a contoured principal section by a transition section which is free from excess stress concentrations.

A further object is to provide a shield assembly arranged so as to be adaptable for use with a variety of bracket units, each individually tailored to a particular application, whereby various models of similar vehicles may use the same or similar deflector screen and different brackets without sacrificing the breakaway mounting feature of the invention.

The foregoing and other objects of the invention are achieved in practice by providing a shield assembly for attachment to the hood of the road vehicle wherein the shield assembly includes a one-piece deflector unit with a principal section adapted to protect the exterior surface of the vehicle hood and a rearwardly extending mounting section, a plurality of mounting brackets, each including hood attachment and shield attachment sections, with the mounting brackets being secured to the shield by frangible fasteners having an ultimate yield strength such that forces tending to separate the deflector unit from the brackets will cause the fasteners to break before the elastic limits of the deflector unit are reached or exceeded. Preferably, the mounting brackets are of metal and have a thinner cross-section than the material from which the shield is made.

The manner in which the foregoing and other objects and advantages of the invention are achieved in practice will become more clearly apparent when reference is made to the following detailed description of the preferred embodiments of the invention and shown in the accompanying drawings, wherein like reference numbers indicate corresponding parts throughout the various figures.

BRIEF DESCRIPTION OF THE DRAWINGS

FIG. 1 is a perspective view of a vehicle showing the hood shield assembly of the invention attached thereto and in its position of use in association with the vehicle;

FIG. 2 is an enlarged front elevational view, with portions broken away, showing the frontal aspect of the hood shield and certain details of the associated vehicle and the shield mounting structure;

FIG. 3 is a further enlarged fragmentary vertical section view of a portion of the hood shield assembly of the invention, taken along lines 3—3 of FIG. 2;

FIG. 4 is a still further enlarged fragmentary vertical section view, with certain parts shown in exploded relation, illustrating the bracket mounting system for the hood shield assembly, including the brackets and fasteners used therefor;

FIG. 5 is a fragmentary vertical sectional view similar to FIG. 4, showing the parts thereof in assembled relation; and FIG. 6 is a bottom plan view, taken along lines 6—6 of FIG. 4, and showing the relation of one mounting bracket to the mounting flange of the mounting section of the deflector unit.

DESCRIPTION OF THE PREFERRED EMBODIMENTS OF THE INVENTION

While the invention is able to assume different forms and may be usefully applied to different kinds of vehicles, and is further able to be made from differing materials and otherwise to differ slightly in detail as among different embodiments, a description of a preferred form of shield will be made wherein the assembly is affixed to the forward portion of a pickup truck, is made from a translucent thermoplastic material, and is secured to the vehicle by adjustable brackets forming a part of the mounting system.

Referring now to the drawings in greater detail, the invention is shown to be embodied in a hood shield assembly generally designated 10 and shown to be used in association with a vehicle generally designated 12. The vehicle 12 is shown to include a hood portion generally designated 14 and terminating generally in the vicinity of the vehicle front end, generally designated 16 in FIG. 1. The front end 16 includes conventional elements such as a front bumper 18, pairs of headlights generally designated 20, and a decorative grille 22 covering the radiator and other portions of the engine bay of the vehicle. To the rear of the hood 14 are remaining portions of the vehicle, including a cowl 24 of the from which a windshield 26 extends upwardly.

According to the invention, the hood shield assembly 10 includes a unitary deflector unit generally designated 28, positioned such that it lies ahead of and covers forwardly extending, upwardly directed portions of the vehicle hood.

Referring in particular to FIGS. 2 and 3, it will be noted that the deflector unit 28 includes a contoured principal section 30, which is struck by the airborne debris against which the shield is effective, a generally flat, rearwardly extending mounting section 32, and a gently curved transition section 34 which extends between and joins the lower portion of the principal section 30 to the front portion of the mounting section 32.

The preferred form of shield shown in the solid line drawing of FIG. 3 also includes a shield crown portion 36 which is inclined rearwardly and upwardly with respect to the continuation of the principal shield section 30. The crown portion 36 terminates in a free upper trailing edge 38, while the mounting section 32 terminates in a rear trailing edge 40. In the installed position of use illustrated, the trailing edge 40 of the mounting section 32 is spaced just forwardly apart from a trim piece 42 lying on the nose or lowermost portion 44 of the exterior hood panel 46. As is typical with most vehicles, the exterior panel 46 is supported by a hood reinforcing panel 48 which includes front and rear flanges 50, 52 which serve as points for attaching this panel 48 to the exterior hood panel 46. In the form shown, the lower portion 49 of the reinforcing panel 48 is horizontal an in use comprises a fastener-receiving section for mounting the shield brackets to be described.

FIG. 3 also shows that, in addition to providing a panel 49 through which the fasteners for the brackets to be described will be located, the reinforcing panel 48 also positions a latch claw 54 which extends in use through an opening 56 in a panel 58 positioning a slide latch 60 to secure the latch claw 54. The elements of this mechanism are well known to those skilled in the art and are thus not described in detail. However, it is to be noted that there is only a relatively small working clearance between the undersurface of the fastener-receiving section 49 or other portion of the hood reinforcing panel 48 and the opposed portions of the lower panel 58. This clearance is shown as "C" in FIG. 3, but is enlarged for purposes of illustration.

Referring now to FIGS. 4 and 5, certain details of the preferred form of mounting bracket generally designated 62 and its cooperation with shield mounting and bracket mounting fastener assemblies 64, 66 are shown. In addition, FIGS. 3 and 4 show certain dimensional characteristics and relations of these various elements, as will now be discussed.

Referring now in particular to FIG. 4, it will be noted that the mounting section 32 of the deflector unit 28 is in the form of a generally flat panel 68, having its lower trailing edge 40 spaced apart from an opening 70 for passage of the shank 72 of the shield mounting fastener generally designated 74.

According to the invention, there is a free rear margin "M" extending between the rearmost edge of the opening 70 for the fasteners and the trailing edge 40 of the shield. The diameter of the opening 70 is shown as dimension "D" in FIG. 4. According to the invention, "M" should be greater than "D", and preferably two or three times as great.

Referring still to FIG. 4, it will be noted that a mounting bracket generally designated 62 is shown to include a forward or shield mounting portion generally designated 76, a rear or hood mounting portion generally designated 78, and an intermediate section generally designated 80. In the form of bracket shown in FIG. 3, this intermediate section is straight, while the embodiment in FIG. 4, the intermediate section 80 is shown to include an offset or angularly related strip 82 extending between adjoining the portions 76, 78.

Referring now to the fastener, and in particular to the shield mounting fastener assembly 64, this unit is shown not only to include the machine screw or bolt 74 having the threaded shank portion 72, but to include a flanged nut unit 84. In addition, an elastomeric or like flat, vibration absorbing washer 86 is disposed between the undersurface of the head of the fastener 74 and the downwardly facing surface of the mounting bracket 62. Inasmuch as the nut and bolt portions 74, 84 of the fastening assembly 64 are intended to be breakaway units, they are made from a tough but moderately brittle material, such as nylon or other thermoplastic material.

Referring now to the bracket mounting fastener assembly 66, it is shown that this is intended to be adjustably positioned within a slot 88 disposed at the hood mounting end portion 78 of the bracket 62. The preferred form of fastener 66 is a self-tapping metal screw, locked in place by a star washer 90 or its equivalent.

Referring now to the use of the shield assembly of the invention, an assembly and installation is customarily made by the simple expedient of assembling the parts in a known manner. Preferably, the plurality of appropriately sized brackets for the particular intended application are mated with the shield selected for that application. The brackets are then mounted with finger tight force so that they are secured and aligned with respect to the shield. Next, the hood of the vehicle is opened and the downwardly facing bracket mounting flange such as a flange 49 is presented. The shield is positioned such that the trailing edge 40 of the mounting section 68 is spaced apart by at least a working clearance from the forwardmost portion of the hood, such as the trim piece 42 or the like. This will bring the slots 88 in the mounting bracket 62 into registry with a suitable surface 49 of the hood reinforcing panel 48. The panel is then marked using a stylus, punch, or marking pencil for the intended areas wherein holes are to be formed. If self-tapping screws are provided, the brackets may simply be held and the screws inserted through the reinforcing panel 48. In the alternative, having appropriately marked the panel, openings may be drilled and the brackets may thereafter be installed in a conventional manner, whether or not they are attached to the shield unit. If the brackets are mounted without the shield, the shield is then subsequently attached. Fasteners used to mount the shield to the bracket are then installed firmly, but not overtightened, using the plastic fasteners and the shock absorbing washers provided with the kit.

In the preferred form of installation, the thickness of the shield material itself is about 3/16 of an inch, that is, approximately 0.187 inches, more or less. A full, nominal 3/16 inch is 0.1875 inches, but the actual material may be somewhat thinned by the drape forming methods used to impart contours to the product. With a hood shield of such thickness, the mounting brackets are preferably made from a spring steel, or other relatively tough steel of approximately 0.080 inches in thickness. The brackets are preferably just less than one inch in width, such as ⅞ inches. The diameter of the opening for receiving the shank portion of the fastener is just larger than the diameter of the shank, and if a ¼ inch nominal fastener is provided, the opening size may be 0.270 inches, for example. The preferred form of metal screws are those having a shank of perhaps 0.150 inches and these are received in a slot 88 having a width of just under 0.200 inches.

Referring now to other dimensional characteristics which are important to the preferred practice of the invention, the radius "R" of what may be termed the lower transition section 92 of the shield, i.e., the portion between the main impact-receiving portion and the mounting section is preferably made such that its radius of curvature is equal to or greater than twice the thickness of the material. In one preferred form, the cross-sectional curvature of the transition portion 92 is 0.60 inches with the thickness of the material being substantially less than 0.2 inches. The thicknesses of the metal and plastic materials respectively comprising the bracket and the shield are shown as thicknesses "T-1" and "T-2" in FIG. 5.

As pointed out in the specification, it is preferred but not necessary that the plastic material making up the shield be translucent, but not completely transparent. A dark color, such as a darkly tinted or shaded green or brown color is suitable for many applications. While the invention does not rule out the use of clear plastic materials, scratches, nicks and the like imparted to them over a period of time are more visible in the tint-free plastics, and hence these are not preferred.

Referring now to advantages of the invention, the ability to close the hood with the unit installed is not compromised because the thin cross-section of the mounting brackets and the spacing of the trailing edge from the nose portion of the hood. The use of plastic fasteners provides a breakaway capability which is important in use. Thus, even if the shield is mishandled by using it to slam or raise the hood, the shield will not normally break with this kind of abuse, inasmuch as the fasteners will fail before the shield breaks. Moreover, by reason of its gradual contours, is compartively free of stress concentrations and less subject to breakage even if such fasteners are not utilized.

The unit is adaptable to a raised crown serving as a bug deflector unit 36, as pointed out. The brackets shown are those having an angled offset portion with two horizontally extending sections for mounting screws or bolts. However, it will be understood that the portion of the bracket to be affixed to the hood may assume any position which is appropriate for the intended application and the end of the bracket thus need not be horizontal in use for this purpose.

As will be appreciated, the use of the brackets separate from the shield makes the concept of "universal" mounting more easily approachable, even though different makes and models of cars may require different shields. With the present mounting system, however, a given shield will readily fit more applications than would be the case if a tab or like mounting system integral with the shield were used.

Another important feature of the invention is the mounting system permits a reasonable spacing between the rear surface of the principal shield portion and the hood so that maintenance is simplified. The rear surface may be dusted or cleaned without difficulty and the front of the hood may be maintained without requiring removal of the shield. The rigid mounting of the brackets relative to the hood but the provision of breakaway fasteners and shock absorbing or damping fasteners and washers greatly reduces or eliminates breakage in normal use.

It will thus be seen that the present invention provides a shield unit having a number of advantages and characteristics including those referred to herein and others which are inherent in the invention. It is presumed that variations and modifications of the described form of apparatus will appear to those skilled in the art and it is anticipated that such modifications and changes may be made without departing from the spirit of the invention and the scope of the appended claims.

I claim:

1. A shield assembly for attachment to the hood of a road vehicle, said shield assembly comprising, in combination, a one-piece deflector unit, a plurality of mounting brackets, and plural fasteners securing said brackets to said deflector unit, said deflector unit being formed in a single piece from a sheet of resinous plastic material and including a contoured principal section adapted to protect the exterior surfaces of said road vehicle hood from damage by airborne objects and a substantially horizontally extending mounting section joined to and extending rearwardly from the lower portion of said principal section, said mounting section having a rear margin terminating in a free trailing edge portion, said principal section, in position of use, being contoured so as to have portions lying generally parallel to and in spaced apart relation to adjacent sections of an associated vehicle hood, with said mounting section including plural, laterally spaced apart fastener-receiving openings of a given diameter, said openings lying forward of said rear margin so that the width of said margin substantially exceeds said given diameter of said openings, each of said mounting brackets including a hood attachment section with means for receiving a bracket mounting fastener, a shield attachment section with means for receiving a shield mounting fastener, and an intermediate shield positioning section, said assembly further including frangible fasteners securing each of said shield attachment sections of said brackets to said shield mounting section, with said frangible fasteners having an ultimate yield strength such that forces tending to separate said deflector unit from said brackets will cause breakage of said fasteners without stressing said one piece deflector unit beyond its elastic limits.

2. A hood shield unit as defined in claim 1 wherein said fasteners comprise bolt and nut assemblies made from a thermoplastic material.

3. A hood shield unit as defined in claim 1 wherein said fasteners are screws made from a nylon material.

4. A hood shield unit as defined in claim 1 wherein said fasteners are made from plastic materials, and wherein said assembly further includes force distributing and vibration damping washers of a compressible elastomeric material disposed between opposed facing surfaces of said bracket and said deflector unit mounting section.

5. A hood shield unit as defined in claim 1 wherein said mounting brackets are made from a relatively rigid metal material, said brackets having a thickness of less than one-half the thickness of said deflector unit.

6. A hood shield unit as defined in claim 1 wherein said deflector unit has a cross-sectional thickness of approximately 3/16 of an inch.

7. A hood shield unit as defined in claim 1 wherein said thermoplastic material is a translucent acrylic plastic material.

8. A hood shield unit as described in claim 1 wherein said principal section of said deflector unit includes a main shield portion and further includes a crown portion lying above and to the rear of said main shield portion, said crown portion being inclined upwardly with respect to said main portion, in order to provide, in use, further air deflection over a portion of the windshield of an associated vehicle.

* * * * *